United States Patent [19]

Nozaki

[11] Patent Number: 4,872,288
[45] Date of Patent: Oct. 10, 1989

[54] SEALING STRUCTURE FOR AUTOMOBILE

[75] Inventor: Masahiro Nozaki, Ama, Japan

[73] Assignee: Toyoda Gosei Co., Ltd., Nishikasugai, Japan

[21] Appl. No.: 199,153

[22] Filed: May 26, 1988

[30] Foreign Application Priority Data

Sep. 22, 1987 [JP] Japan .............................. 62-144907[U]

[51] Int. Cl.$^4$ ................................................ E06B 7/16
[52] U.S. Cl. ........................................ 49/485; 49/401
[58] Field of Search ................. 49/485, 475, 480, 481, 49/374, 477, 440, 401; 296/202

[56] References Cited

U.S. PATENT DOCUMENTS 4,694,611 9/1987 Okumura .............................. 49/441

Primary Examiner—Kenneth J. Dorner
Assistant Examiner—Gerald A. Anderson
Attorney, Agent, or Firm—Cushman, Darby & Cushman

[57] ABSTRACT

A sealing structure around a door of an automobile has a weather strip of a uniform width, which is installed in a vertical side of a door frame of a front door. In a center pillar of the automobile is formed a projecting portion to come in contact with the weather strip when the front door is closed. A sealing surface of the projecting portion inclines so as to gradually project towards the weather strip from the position close to the belt line to the position close to the roof side. This results in the gap between the door frame and the center pillar being gradually decreased upwards so as to gradually increase the quantity of flection of the weather strip upwards. This sealing structure maintains sufficient sealing property with a door closing force hardly increased if the front door is drawn out while the automobile is running at a high speed.

3 Claims, 2 Drawing Sheets

SEALING STRUCTURE FOR AUTOMOBILE

BACKGROUND OF THE INVENTION

1. Field of the Invention

The present invention relates to a sealing structure around a door of an automobile, and more particularly to a sealing structure between a pillar portion and a door frame of an automobile.

2. Description of the Prior Art

In an automobile shown in FIG. 1, weather strips are installed around door frames 2, or door openings including piller portions 3, 4 and 5. These weather strips seal between the door frames 2 and the door openings while doors 1A and 1B are closed.

When an automobile runs at a high speed, the air pressure becomes negative in the portions along a front pillar and a roof side outside the automobile, and pressure difference is generated between the inside and the outside of the door. This pressure difference results in the upper portion of each of the doors 1A and 1B being drawn out, and each of the door frames 2 being bent outwards (in the direction of an arrow F) as shown in FIG. 6. This causes the decrease in sealing force, and sometimes incurs the generation of aspiration noise.

This aspiration noise can be prevented by making the sectional shape of the weather strip large so as to give a large quantity of flection to the weather strip and maintain the sealing property thereof even if the doors 1A and 1B are drawn out. However, the large-sized weather strip increases the door closing force required for closing doors, and this is inconvenient. Particularly, the large-sized weather strips which are to come in contact with pillar portions, especially the center pillar 3 have great influence on the door closing force.

SUMMARY OF THE INVENTION

It is an object of the present invention to provide a sealing structure between pillar portions and door frames, by which sufficient sealing property can be maintained while a door closing force is hardly increased even when the doors of a high speed running automobile are drawn out.

According to the present invention, the quantity of flection of the weather strip provided between the pillar portions and opposed door frames, is gradually increased upwards from the belt line of doors.

The above described increase in quantity of flection of the weather strip is realized by gradually decreasing the gap between the pillar and the opposed door frame upwards from the belt line of the doors.

Furthermore, the above described increase in quantity of flection of the weather strip can be also realized by gradually increasing the width of the weather strip in the direction in which the weather strip is pressed by the pillar and the door frame with the gap between the pillar and the opposed door frame unchanged.

When the automobile runs at a high speed, the upper portion of the doors 1A and 1B are drawn out, and the door frames 2 are bent outwards. This bending of the door frames 2 is gradually increased from the belt line 10 to an upper end of each door frame as shown in FIG. 6.

According to the present invention, the quantity of flection of the weather strip to come in contact with the pillar portions or the door frames is increased upwards in accordance with the increase in outward bending of the door frame 2. The weather strip having this increased quantity of flection exhibits a sealing force large enough against the pillar portions even at an upper end thereof while the door is bent outwards. The weather strip according to the present invention requires only much smaller door closing force as compared with the weather strip of which the quantity of flection is made equally large over the full length thereof.

BRIEF EXPLANATION OF THE DRAWINGS

FIG. 2 is a sectional view of a sealing structure between a center pillar and a front door, taken along the line of II—II of FIG. 1;

FIG. 3 is a sectional view taken along the line III—III of FIG. 1;

FIG. 4 is a sectional view taken along the line of II—II of FIG. 1;

FIG. 5 is a sectional view taken along the line of III—III of FIG. 1; and

DETAILED DESCRIPTION OF THE EMBODIMENTS

Figure 1:
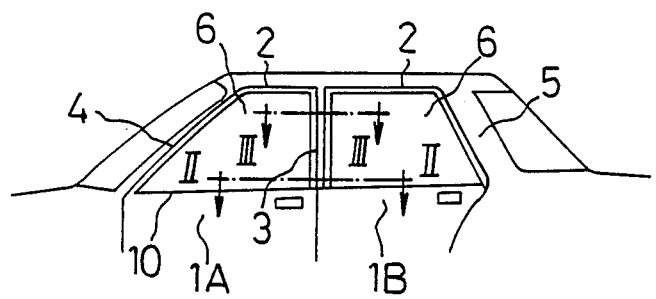
FIG. 1 is a side view of an automobile to which a sealing structure according to the present invention is applied.
Figure 2:
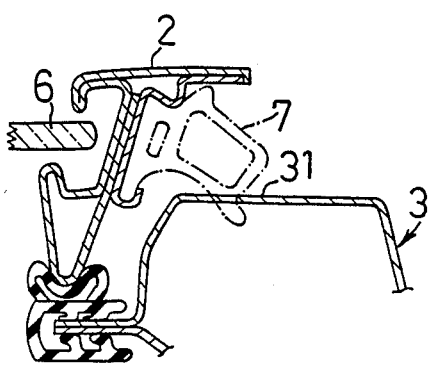
FIGS. 2 and 3 illustrate a first embodiment of the sealing structure according to the present invention.
Figure 3:
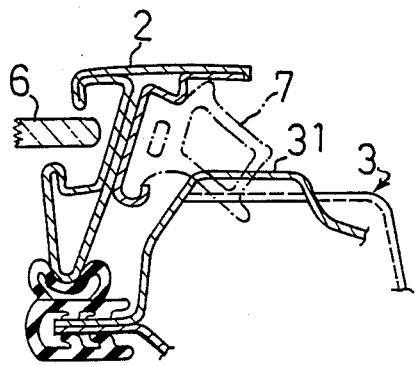

In a first embodiment of the sealing structure according to the present invention shown in FIGS. 1 through 3, a hollow weather strip 7 is installed around a door frame 2 of each of the doors 1A and 1B.

The weather strip 7 installed in the vertical side of the door frame 2 of the door 1A is opposed to a center pillar 3 and comes in contact therewith as shown in FIGS. 2 and 3. A projecting portion is formed in the pillar 3 so as to come in contact with the weather strip 7. And a sealing surface 31 of the projecting portion inclines so as to gradually project towards the weather strip 7 from the position close to the belt line 10 (FIG. 2) to the position close to the roof side (FIG. 3). In the drawings, reference numeral 6 designates a door glass.

Instead, a weather strip installing portion of the door frame 2 may be gradually projected towards the center pillar 3 from the belt line to the roof side position.

In the first embodiment, the weather strip 7 is installed in the door frame 2. Instead, the weather strip 7 may be installed in the center pillar 3.

Figure 4:
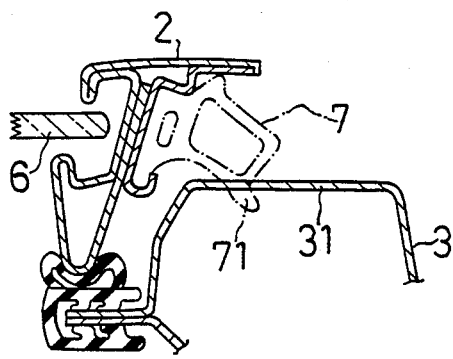
FIGS. 4 and 5 illustrate a second embodiment of a sealing structure according to the present invention.
Figure 5:
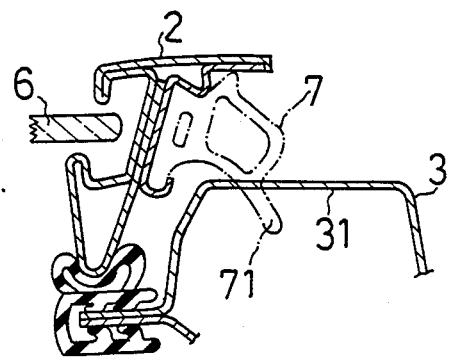
Figure 6:
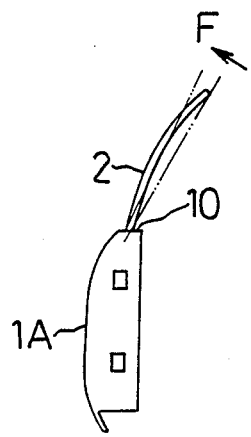
FIG. 6 is a view illustrating the condition of a door frame bent due to the outward drawing of a door.

FIGS. 4 and 5 illustrate a second embodiment of a sealing structure according to the present invention. The sealing surface 31 of the center pillar 3 is formed in parallel with the door frame 2 in which the weather strip 6 is installed. The length of the seal lip 71 to come in contact with the sealing surface 31 of the center pillar 3 is gradually increased from the position close to the belt line 10 (FIG. 4) to the position close to the roof side (Fig. 5).

In the case that the weather strip 7 is installed in the center pillar 3, the length of the sealing lip to come in contact with the door frame 2 is gradually increased upwards.

In any one of the preceding embodiments, the quantity of flection of the weather strip is gradually increased upwards. For example, the quantity of flection of the weather strip at the roof side position is 8 to 9mm in the case that the quantity of flection near the belt line is 5 to 6 mm.

According to the present invention, by sufficiently increasing the quantity of flection of the weather strip 7 at the roof side position, necessary sealing force can be maintained even when the door frame is bent outwards due to the outward drawing of the door. Accordingly, the generation of any aspiration noise can be prevented.

Furthermore, according to the present invention, the quantity of flection is increased in only the upper portion of the weather strip. So, the door closing force is considerably decreased as compared with the case where the quantity of flection of the weather strip along the center pillar 3 is made large over full length thereof.

The sealing structure according to the present invention can be applied to the sealing between the front pillar 4 (FIG. 1) and the front door 1A, between the center pillar 3 and the rear door 1B and between the quarter pillar 5 (FIG. 1) and the rear door 1B.

The quantity of flection of the weather strip has large influence on the door closing force especially in the portion along the center pillar 3. Therefore, the present invention has an especially preferable effect when being applied to the sealing along the center pillar 3.

What is claimed is:

1. A sealing structure for sealing a gap between a door opening of an automobile body and a door frame by means of a weather strip, comprising:

said weather strip installed on one of a pillar defining said door opening, and said door frame opposed to said pillar for sealing a gap between said pillar and said door frame, has a quantity of flection, which is gradually increased upwards from a belt line of a door of said automobile body.

2. A sealing structure according to claim 1, wherein said weather strip has a uniform width in the direction in which said weather strip is pressed by said pillar and said door frame, and said gap between said pillar and said door frame is gradually decreased upwards from said belt line.

3. A sealing structure according to claim 1, wherein said gap between said pillar and said door frame is uniform, and said weather strip has a width gradually increased upwards from said belt line, in the direction in which said weather strip is pressed by said pillar and said door frame.

* * * * *